(12) United States Patent
Tanaka et al.

(10) Patent No.: US 9,112,677 B2
(45) Date of Patent: Aug. 18, 2015

(54) COMMUNICATION DEVICE AND CRYPTOGRAPHIC KEY CREATION METHOD IN CRYPTOGRAPHIC KEY SHARING SYSTEM

(75) Inventors: Akihiro Tanaka, Tokyo (JP); Akio Tajima, Tokyo (JP)

(73) Assignee: NEC CORPORATION, TOKYO (JP)

( * ) Notice: Subject to any disclaimer, the term of this patent is extended or adjusted under 35 U.S.C. 154(b) by 0 days.

(21) Appl. No.: 14/110,644

(22) PCT Filed: Apr. 6, 2012

(86) PCT No.: PCT/JP2012/002421
§ 371 (c)(1),
(2), (4) Date: Oct. 8, 2013

(87) PCT Pub. No.: WO2012/137513
PCT Pub. Date: Oct. 11, 2012

(65) Prior Publication Data
US 2014/0037087 A1 Feb. 6, 2014

(30) Foreign Application Priority Data
Apr. 8, 2011 (JP) ................................ 2011-085972

(51) Int. Cl.
*H04L 9/00* (2006.01)
*H04L 9/08* (2006.01)

(52) U.S. Cl.
CPC ............ *H04L 9/0816* (2013.01); *H04L 9/0838* (2013.01); *H04L 9/0861* (2013.01); *H04L 9/0894* (2013.01); *H04L 2209/34* (2013.01)

(58) Field of Classification Search
CPC .... H04L 9/0838; H04L 9/0861; H04L 9/0858; H04L 9/0894; H04L 9/0816
USPC .......................................................... 380/44
See application file for complete search history.

(56) References Cited

U.S. PATENT DOCUMENTS 4,417,338 A * 11/1983 Davida .......................... 380/286
5,054,066 A * 10/1991 Riek et al. ...................... 380/30

(Continued)

FOREIGN PATENT DOCUMENTS

| JP | 2007-53590 A | 3/2007 |
| JP | 2007-86170 A | 4/2007 |
| JP | 2010-251976 A | 11/2010 |
| WO | 2008/013008 A1 | 1/2008 |

OTHER PUBLICATIONS

A. Tanaka et al.,"Ensuring Quality of Shared Key through Quantum Key Distribution for Practical Application," IEEE Journal of Selected Topics in Quantum Electronics, vol. 15, No. 6, Nov.-Dec. 2009, pp. 1662-1629.

(Continued)

*Primary Examiner* — Techane Gergiso
(74) *Attorney, Agent, or Firm* — Sughrue Mion, PLLC

(57) ABSTRACT

A communication device and a cryptographic key creation method are provided that enable efficient creation of cryptographic keys of which different error rates are required. A communication device (11) that performs communication with another communication device (12) through a transmission link includes a cryptographic key sharing section (1103) that share a first cryptographic key with the other communication device, an error rate control section (1115, 1105-1108) that creates second cryptographic keys with error rates according to purposes of use of the cryptographic keys from the first cryptographic key, and an accumulation section (111, 1112) that separately accumulates the plurality of second cryptographic keys with the different error rates.

15 Claims, 7 Drawing Sheets

(56) References Cited

U.S. PATENT DOCUMENTS

| | | | |
|---|---|---|---|
| 5,574,785 A * | 11/1996 | Ueno et al. | 380/2 |
| 6,363,485 B1 * | 3/2002 | Adams et al. | 713/186 |
| 7,373,580 B2 * | 5/2008 | Inokuchi et al. | 714/752 |
| 7,406,600 B2 * | 7/2008 | Thomas et al. | 713/181 |
| 2005/0117745 A1 * | 6/2005 | Lee et al. | 380/30 |
| 2007/0124646 A1 * | 5/2007 | Inokuchi et al. | 714/758 |
| 2007/0294609 A1 * | 12/2007 | Inokuchi et al. | 714/769 |
| 2008/0147820 A1 * | 6/2008 | Maeda et al. | 709/213 |
| 2009/0028262 A1 * | 1/2009 | Imai et al. | 375/267 |
| 2009/0041236 A1 * | 2/2009 | Gligoroski et al. | 380/43 |
| 2009/0254981 A1 * | 10/2009 | Devadas et al. | 726/5 |
| 2010/0172496 A1 * | 7/2010 | Furukawa | 380/46 |

OTHER PUBLICATIONS

J. Hasegawa et al., "Experimental Decoy State Quantum Key Distribution with Unconditional Security Incorporating Finite Statistics," eprint arXiv: 0705.3081, May 22, 2007.

G. Brassard et al., "Secret-key Reconciliation by Public Discussion", in Advances in Cryptology—EUROCRYPT' 93 Proceedings, Lecture Notes in Computer Science, vol. 765, p. 410-423, 1998.

M. N. Wegman et al., "New Hash Functions and Their Use in Authentication and Set Equality," J. Comput. System Science 22, 1981, pp. 265-279.

International Search Report for PCT Application No. PCT/JP2012/002421, mailed on Jun. 5, 2012.

* cited by examiner

FIG. 6

MANAGEMENT TABLE
2112a, 2211a

| KEY ID | NUMBER OF PARITY CHECKS |
|---|---|
| 0x00 | 32 (FOR ENCRYPTED COMMUNICATION) |
| 0x01 | 32 (FOR ENCRYPTED COMMUNICATION) |
| 0x02 | 1024 (FOR AUTHENTICATION) |
| 0x03 | 32 (FOR ENCRYPTED COMMUNICATION) |
| 0x04 | 32 (FOR ENCRYPTED COMMUNICATION) |
| ... | ... | ial # COMMUNICATION DEVICE AND CRYPTOGRAPHIC KEY CREATION METHOD IN CRYPTOGRAPHIC KEY SHARING SYSTEM This application is a National Stage Entry of PCT/JP2012/002421 filed Apr. 6, 2012, which claims priority from Japanese Patent Application 2011-085972 filed Apr. 8, 2011, the contents of all of which are incorporated herein by reference, in their entirety.

TECHNICAL FIELD

The present invention relates to a system for creating cryptographic keys based on random number information that has been shared, such as quantum key distribution technology and, in particular, to a communication device and a cryptographic key creation method in the same.

BACKGROUND ART

The rapidly growing Internet is convenient, but there are concerns about its security on the other hand, so that there are increasing needs for cryptographic technology to ensure the secrecy of communication. Cryptographic systems that are currently used in general can be divided into secret key cryptography, such as DES (Data Encryption Standard) and Triple DES, and public key cryptography, such as RSA (Rivest Shamir Adleman) and elliptic curve cryptography. However, these are cipher communication methods that ensure the security based on the "complexity of computation" and are in constant jeopardy of being cracked by an enormous volume of computation or at the advent of a cryptanalytic algorithm. In such a background, the quantum key distribution system (QKD) has attracted attention as a technology for cryptographic key distribution that "will never be eavesdropped."

In QKD, photons are generally used for communication media, and information is transmitted by being encoded in the quantum states of photons, such as their polarization, phase, and the like. An eavesdropper on a transmission link eavesdrops on information by tapping the photons that are being transmitted or by any other way. However, according to Heisenberg uncertainty principle, it is impossible to perfectly return photons once observed to their quantum states before they were observed, and so a change occurs in the statistical values of received data detected by a legitimate receiver. The receiver can detect the eavesdropper on the transmission link by detecting such a change.

In a case of quantum key distribution utilizing photon polarization, a sending-side communication device and a receiving-side communication device (hereinafter, referred to as "Alice" and "Bob," respectively) organize an optical interferometer, and Alice and Bob individually modulate the phase of each photon at random. The difference in depth between these modulated phases provides an output of 0 or 1. Thereafter, Alice and Bob reconcile part of the conditions used when the output data were measured, whereby the same string of bits can be finally shared between Alice and Bob. Hereinafter, a flow of general quantum cryptographic key creation will be described briefly, with reference to FIG. 1.

Referring to FIG. 1, random numbers generated at Alice are transmitted to Bob through quantum key distribution (single photon transmission), but a large volume of information is lost along a transmission link. A string of random numbers shared at this stage between Alice and Bob is called a raw key (raw-key sharing S1). Subsequently, Alice and Bob perform basis reconciliation, thereby discarding bits whose bases do not match (sequence S1.5). An obtained string of shared random numbers, whose volume is half the original volume due to this process, is called a sifted key (sifted-key sharing S2).

Then, after undergoing an error correction process to correct errors that have crept in at the stage of quantum key distribution, a remaining error detection process to detect remaining errors that cannot be corrected by the error correction, and privacy amplification to screen out a volume of information that is supposed to be leaked to an eavesdropper (sequence S2.5), the remaining ones become a final key that will be actually used as a cryptographic key (final-key sharing S3). The final key thus created is not only used as a cryptographic key for encrypted communication but also used for message authentication to check whether a communication that a transmitter and a receiver have performed is not tampered.

Here, if an error is included in key information to be put into privacy amplification processing, the error is amplified in the privacy amplification processing. As disclosed in NPT 1, the error rate becomes m/2 times the original rate when privacy amplification processing is performed by using a general Toeplitz matrix with a size of m×n, and becomes (n−m)m/2n times the original rate when a privacy amplification method as disclosed in PTL 1 is used. As disclosed in NPT 2, it is preferable that n bits for the matrix size used in privacy amplification processing are not less than 100 kbits, considering the effect of statistical fluctuations occurring when an estimation of the volume of leaked information is made. Therefore, in any one of the above-described privacy amplification methods, the error rate after privacy amplification processing becomes several tens of thousands times higher than the error rate before the processing. Accordingly, it is necessary to make the error rate of key information sufficiently small through error correction and remaining error detection processing when the key information is put into privacy amplification processing.

<Error Correction and Remaining Error Detection Processing>

For the error correction processing, for example, a method as shown in NPL 3 is used. In this method, key information is divided into a plurality of blocks at Alice and Bob, and the parity of each block is checked, whereby a block including an error is identified. Then, error correction is performed by applying a Hamming code or the like to such a block. In addition, supposing that a single block might include an even number of errors, a string of secret bits is rearranged, and then parity check and error correction are performed again.

FIG. 2 shows an example of the remaining error detection processing when the number of parity calculations V=4. In the remaining error detection processing, about half of the bits of key information are chosen out at random, and the parity thereof is checked between Alice and Bob. When parities do not match, the above-described error correction processing is performed again. As shown in FIG. 2, the error rate of a shared key becomes ¹⁄₂₄ or lower after parity check is repeated four times. However, since information about a cryptographic key is leaked through parity check, it is necessary to discard as many bits as the number of times (V) parity check is performed. In the example shown in FIG. 2, since parity check is repeated V=4 times for key information of 24 bits, 4 bits are discarded, with key information of 20 bits remaining. Accordingly, if the number of parity checks is increased in order to ensure a lower error rate, discarded bits increase, resulted in the rate of creation of a final key being degraded.

<Final Key>

Referring back to FIG. 1, the cryptographic key shared through QKD as described above is used for various purposes. One of the most typical uses is to encrypt and decrypt a common encrypted communication (encrypted communication S4). For such a use, there is a method of use in which a cryptographic key is used once and discarded in a one-time-pad manner, and there is another method of use to periodically update an AES (Advanced Encryption Standard) cryptographic key.

Moreover, the security of a cryptographic key cannot be ensured if the contents of communications (S1.5 and S2.5) performed between Alice and Bob in the process of sharing a cryptographic key in QKD are tampered. Accordingly, message authentication needs to be performed, and the cryptographic key is also used for this message authentication (message authentication S5).

An authentication method disclosed in NPL 4 is a method that can ensure information-theoretic security. FIG. 3 shows an example of a use thereof. Referring to FIG. 3, a message is sequentially shortened by matrix operation or the like using a cryptographic key, and a hash value is calculated. When the hash values calculated by Alice and Bob are different from each other, it is determined that there is a possibility that the content of a communication has been tampered, and a cryptographic key corresponding to the content of the communication for which this hash value is calculated is discarded.

CITATION LIST

Patent Literature

[PTL 1] Japanese Patent Application Unexamined Publication No. 2007-086170

Non Patent Literature

[NPL 1] A. Tanaka, W. Maeda, S. Takahashi, A. Tajima, and A. Tomita, "Ensuring Quality of Shared Key through Quantum Key Distribution for Practical Application," IEEE J. of Sel. Top. Quant. Elec., vol. 15, no. 6, pp. 1662-1629 (2009)

[NPL 2] J. Hasegawa, M. Hayashi, T. Hiroshima, A. Tanaka, and A. Tomita, "Experimental Decoy State Quantum Key Distribution with Unconditional Security Incorporating Finite Statistics," eprint arXiv: 0705.3081 (2007)

[NPL 3] "Secret-key Reconciliation by Public Discussion" G. Brassard and L. Salvail, in Advances in Cryptology—EUROCRYPT' 93 Proceedings, Lecture Notes in Computer Science, vol. 765, p 410-423

[NPL 4] M. N. Wegman and J. L. Carter, "New Hash Functions and Their Use in Authentication and Set Equality," J. Comput. System Sci. 22, 265 (1981)

SUMMARY OF INVENTION

Technical Problem

As described above, a shared cryptographic key is used for various purposes, and a required error rate may vary with the purpose of use. That is, when it is used for one-time-pad, the error rate of a final cryptographic key≈the error rate of an encrypted communication. Therefore, a relatively high error rate is allowed for a final cryptographic key when an error correction code is implemented in a cryptographic communication system. For example, with an error correction code formed by concatenating a BCH (3860, 3824) code and a BCH (2040, 1930) code, the error rate of a final cryptographic key is allowed to be about $3.3 \times 10^{-3}$ at maximum because an error rate of $3.3 \times 10^{-3}$ can be corrected to be $1.0 \times 10^{-12}$ or lower. On the other hand, when a cryptographic key is used for an authentication purpose, a sufficiently low error rate is required because even an error of 1 bit in a cryptographic key makes a large difference between hash values, so that a cryptographic key corresponding to a target message for which the hash value is calculated is discarded, resulting in the cryptographic key creation rate being degraded.

A specific example will be illustrated by using FIG. 3. Assuming that s=128 bits and N=32, the number of bits of a target message for one hash value calculation, a, is 512 Gbits, and that of a cryptographic key required for the hash value calculation is 16 kbits. In a case of allowing an authentication error in 1000 authentications, the error rate of a cryptographic key needs to be $6.1 \times 10^{-8}$ or lower. Since errors in a cryptographic key increase through privacy amplification processing in any of the above-described cases, the error rate of a cryptographic key at the time of being put into privacy amplification is required to have an even lower value. The ratio between the error rates required in both cases is constant, and the error rate in the latter example is required to be lower by about $1.8 \times 10^{-5}$. Therefore, after error correction processing and remaining error detection processing, only an even smaller cryptographic key can be obtained.

Accordingly, if error correction processing and remaining error detection processing are performed on a basis of message authentication purpose, although final cryptographic keys can also be used for one-time-pad, such final cryptographic keys are over-specified for one-time-pad use, which means that the cryptographic key creation rate is redundantly set low.

Accordingly, an object of the present invention is to provide a communication device and a cryptographic key creation method in a cryptographic key sharing system that can efficiently create cryptographic keys of which different error rates are required.

Solution to Problem

A communication device according to the present invention is a communication device that performs communication with another communication device through a transmission link, characterized by comprising: cryptographic key sharing means for sharing a first cryptographic key with the other communication device; error rate control means for creating second cryptographic keys with error rates according to purposes of use of the cryptographic keys from the first cryptographic key; and accumulation means for separately accumulating the plurality of second cryptographic keys with the different error rates.

A cryptographic key creation method according to the present invention is a cryptographic key creation method in a communication device that performs communication with another communication device through a transmission link, characterized by comprising: by cryptographic key sharing means, sharing a first cryptographic key with the other communication device; by error rate control means, creating second cryptographic keys with error rates according to purposes of use of the cryptographic keys from the first cryptographic key; and by accumulation means, separately accumulating the plurality of second cryptographic keys with the different error rates.

A cryptographic key sharing system according to the present invention is a system in which first and second communication devices share a cryptographic key by performing communication through a transmission link, characterized in that the first and second communication devices share a first cryptographic key, and each of the first and second communication devices creates second cryptographic keys with error rates according to purposes of use of the cryptographic keys from the first cryptographic key and separately accumulates the plurality of second cryptographic keys with the different error rates.

Advantageous Effects of Invention

According to the present invention, it is possible to efficiently create cryptographic keys of which different error rates are required.

BRIEF DESCRIPTION OF DRAWINGS

FIG. 6 is a diagram showing an example of a management table that a cryptographic key management section in the second exemplary embodiment refers to when it designates the number of parity checks in remaining error detection processing.

DESCRIPTION OF EMBODIMENTS

According to exemplary embodiments of the present invention, cryptographic keys with different error rates can be individually created and accumulated by controlling error correction circuitry and/or remaining error detection circuitry, whereby it is possible to use the cryptographic keys with different error rates for respective purposes. Hereinafter, exemplary embodiments of the present invention will be described in detail.

1. First Exemplary Embodiment

In a cryptographic key sharing system according to a first exemplary embodiment of the present invention, the purposes of use of cryptographic keys are assumed to be one-time-pad encrypted communication and message authentication, and the error rates of final cryptographic keys are controlled by using a plurality of error correction circuits with different coding rates.

1.1) Configuration

Figure 1:
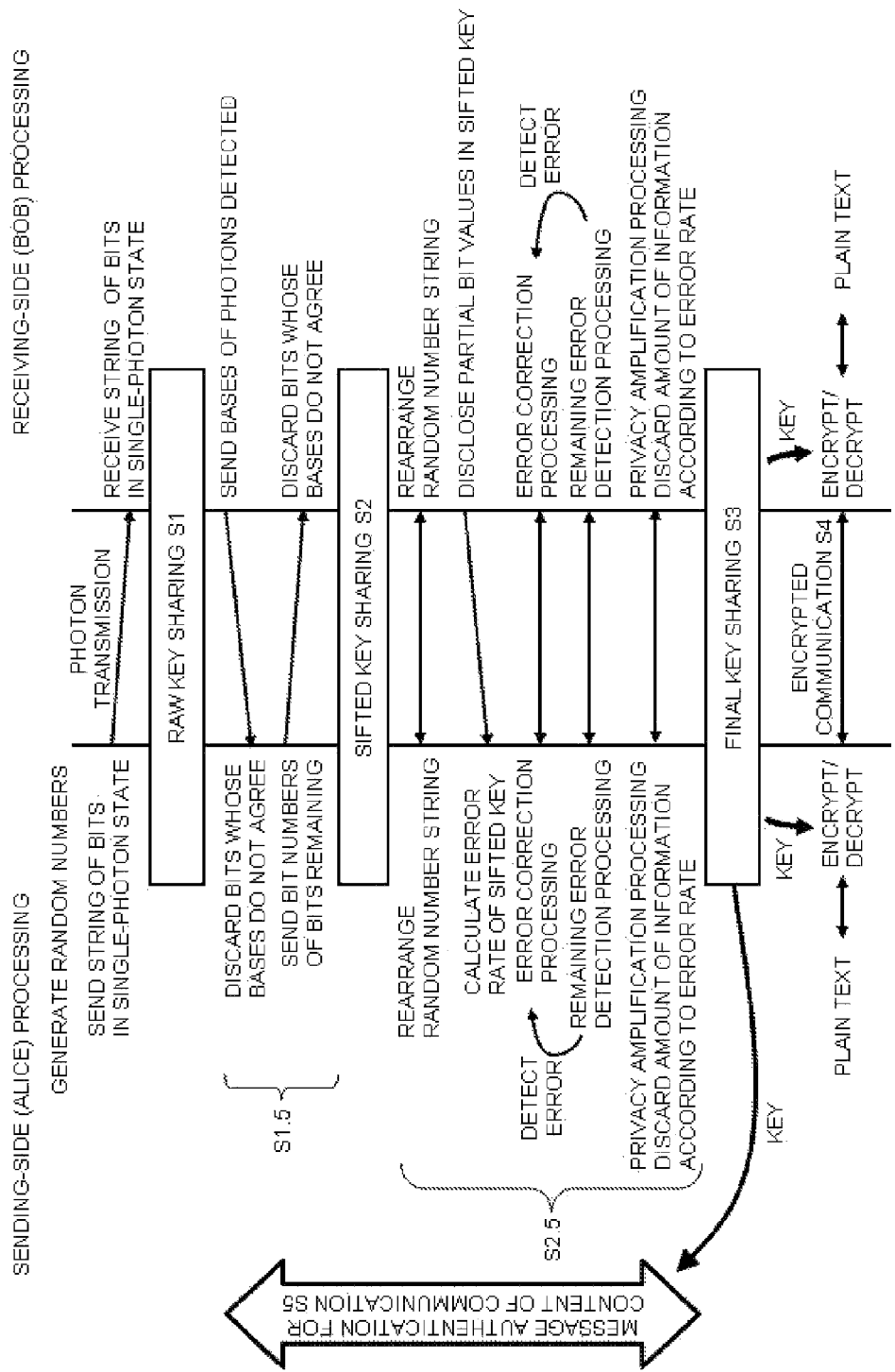
FIG. 1 is a flowchart showing a cryptographic key creation procedure in general quantum cryptographic key distribution.
Figure 2:
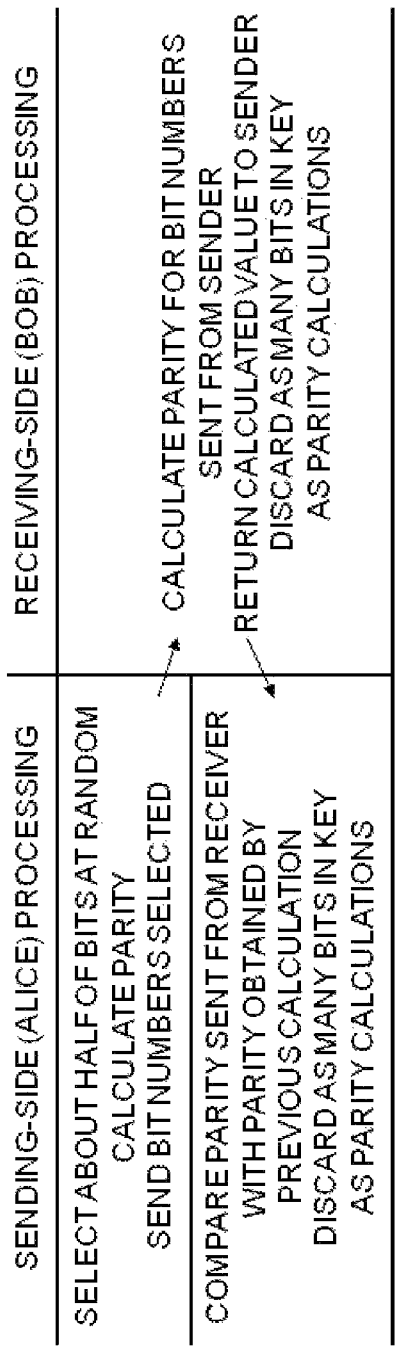
FIG. 2 shows an example of remaining error detection processing.
Figure 3:
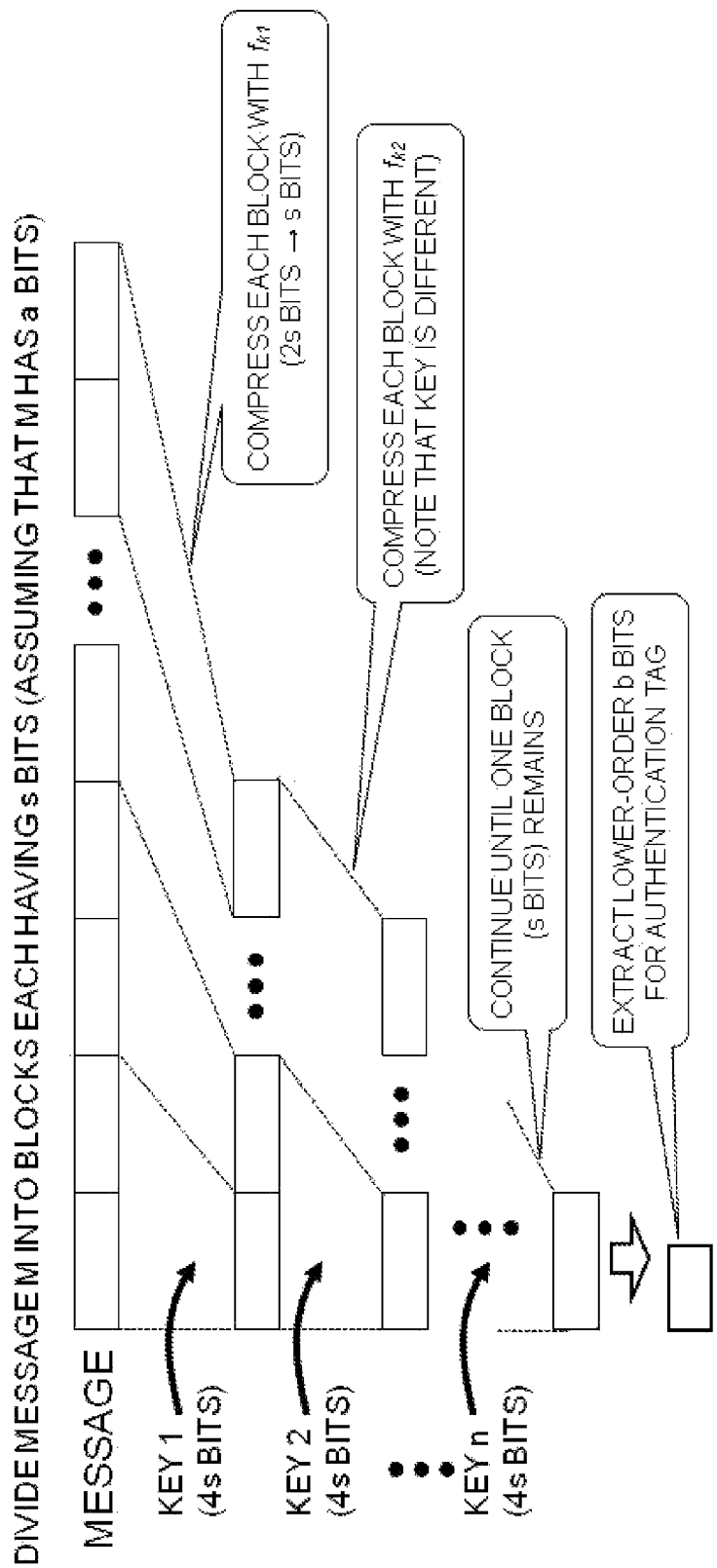
FIG. 3 is a schematic diagram showing an example of calculation of a hash value used in message authentication.
Figure 4:
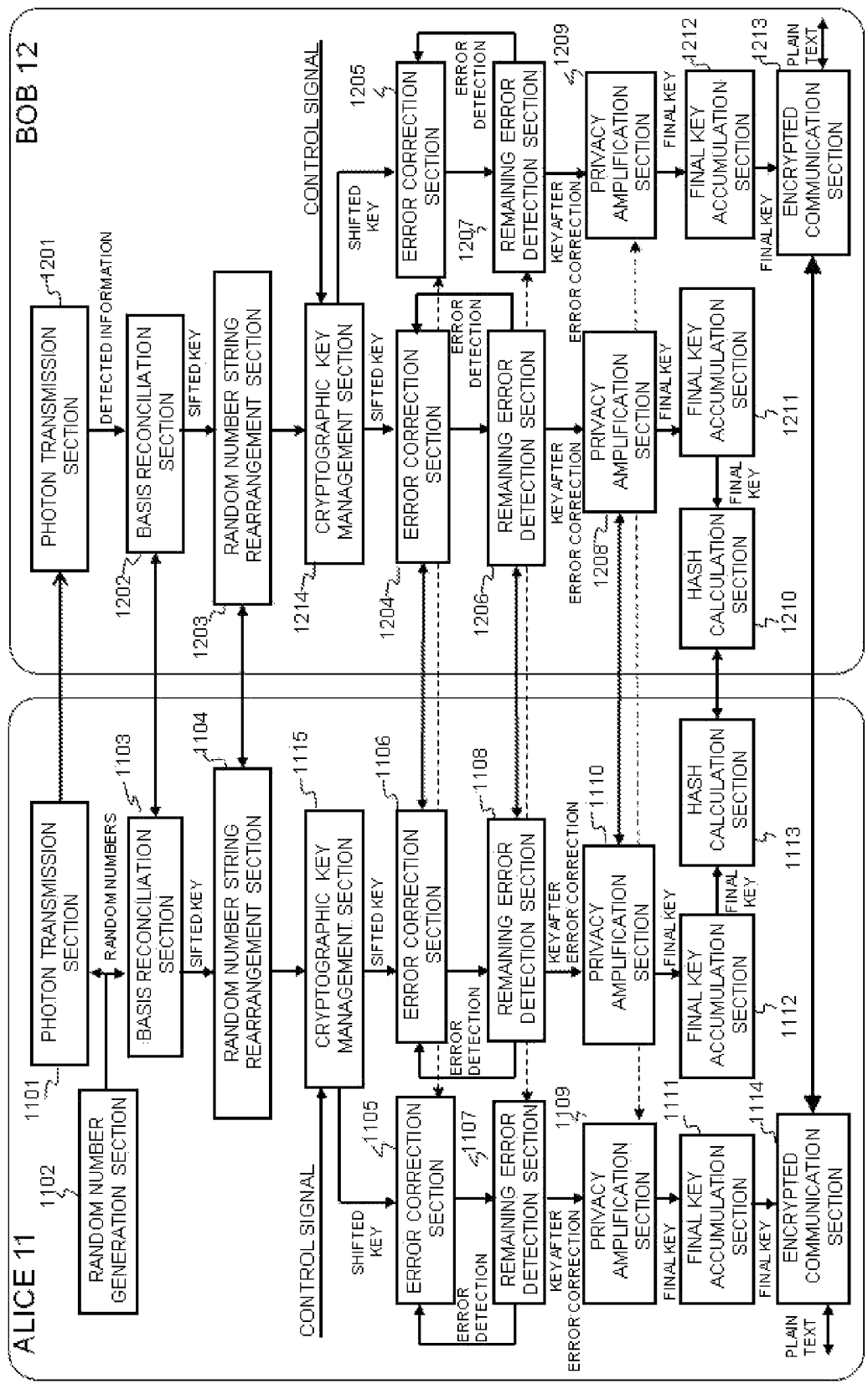
FIG. 4 is a block diagram showing functional configurations of communication devices in a cryptographic key sharing system according to a first exemplary embodiment of the present invention.

Referring to FIG. 4, a sending-side communication device 11 (hereinafter, referred to as Alice 11) and a receiving-side communication device 12 (hereinafter, referred to as Bob 12) are connected through a transmission link, through which photon transmission from Alice 11 to Bob 12 and communication during a cryptographic key creation process between Alice 11 and Bob 12 are performed, as will be described later. The transmission link is formed of optical fiber and is assumed to include a weak-light channel for performing photon transmission and an ordinary-light channel for performing communication during the cryptographic key generation process.

Alice 11 includes a photon transmission section 1101 that transmits a photon signal to Bob 12, a random number generation section 1102, and a basis reconciliation section 1103 that performs basis reconciliation by performing communication with Bob 12, and a sifted key is obtained by the basis reconciliation section 1103 as described already. A random number string rearrangement section 1104 rearranges a random number string of the sifted key at random by performing communication with Bob 12. A cryptographic key management section 1115, in accordance with a control signal, allocates the sifted key after rearrangement to any one of two paths for creating cryptographic keys with different error rates. Here, a cryptographic key with a relatively high error rate is obtained by processing through the path starting from an error correction section 1105, and a cryptographic key with a relatively low error rate is obtained by processing through the path starting from an error correction section 1106. The error correction sections 1105 and 1106 correct errors existing in the sifted keys based on different coding rates, and remaining error detection sections 1107 and 1108 detect errors remaining in the keys after error correction. Privacy amplification sections 1109 and 1110 eliminate key information that has a possibility of being leaked to an eavesdropper, and thus created final cryptographic keys with the relatively high error rate and with the relatively low error rate are accumulated in final key accumulation sections 1111 and 1112, respectively. A hash calculation section 1113, when every communication as described above is performed, uses the cryptographic key with the relatively low error rate accumulated in the final key accumulation section 1112 to calculate a hash value from the content of a communication, thus performing message authentication. An encrypted communication section 1114 uses the cryptographic key with the relatively high error rate accumulated in the final key accumulation section 1111 to perform encryption and decryption for encrypted communication.

Bob 12 includes a photon reception section 1201 that receives a photon signal transmitted from Alice 11, and a basis reconciliation section 1202 that performs basis reconciliation by performing communication with Bob 12, and a sifted key is obtained by the basis reconciliation section 1202 as described already. A random number string rearrangement section 1203 rearranges a random number string of the sifted key at random by performing communication with Alice 11. A cryptographic key management section 1214 allocates sifted keys after rearrangement to two paths. Here, a cryptographic key with a relatively high error rate is obtained by processing through the path starting from an error correction section 1205, and a cryptographic key with a relatively low error rate is obtained by processing through the path starting from an error correction section 1204. The error correction sections 1204 and 1205 correct errors existing in the sifted keys, and remaining error detection sections 1206 and 1207 detect errors remaining in the keys after error correction. Privacy amplification sections 1208 and 1209 eliminate key information that has a possibility of being leaked to an eavesdropper, and thus created final cryptographic keys with the relatively high error rate and with the relatively low error rate are accumulated in final key accumulation sections 1212 and 1211, respectively. A hash calculation section 1210, when every communication as described above is performed, uses the cryptographic key with the relatively low error rate accumulated in the final key accumulation section 1211 to calculate a hash value from the content of a communication, thus performing message authentication. An encrypted communication section 1213 uses the cryptographic key with the relatively high error rate accumulated in the final key accumulation section 1212 to perform encryption and decryption for encrypted communication.

Note that functions equivalent to the random number generation section 1102, basis reconciliation section 1103, random number string rearrangement section 1104, error correction sections 1105 and 1106, remaining error detection sections 1107 and 1108, privacy amplification sections 1109 and 1110, and cryptographic key management section 1115 of Alice 11 can also be implemented by executing programs stored in a memory (not shown) on a program-controlled processor such as a CPU (Central Processing Unit) of Alice 11.

Similarly, functions equivalent to the basis reconciliation section 1202, random number string rearrangement section 1203, error correction sections 1204 and 1205, remaining error detection sections 1206 and 1207, privacy amplification sections 1208 and 1209, and cryptographic key management section 1214 of Bob 12 can also be implemented by executing programs stored in a memory (not shown) on a program-controlled processor such as a CPU (Central Processing Unit) of Bob 12.

1.2) Operation

At Alice 11, the photon transmission section 1101 transmits a photon signal to Bob 12, based on random numbers output by the random number generation section 1102. At Bob 12, the photon reception section 1201 receives the photon signal transmitted from the photon transmission section 1101. Subsequently, processing as described below is performed at Alice 11 and Bob 12, individually.

The basis reconciliation sections 1103 and 1202 reconcile bases that they selected at the time of transmission and reception and extract only those key bits whose selected bases match with each other, thereby individually obtaining a sifted key. Next, the random number string rearrangement sections 1104 and 1203 rearrange the respective sifted keys, based on random numbers that have been shared separately. The rearranged sifted keys are allocated by the cryptographic key management sections 1115 and 1214 to the first paths of the error correction sections 1105 and 1205 for which a higher coding rate is set, or to the second paths of the error correction sections 1106 and 1204 for which a lower coding rate is set, respectively.

The first paths are paths for creating cryptographic keys to be used for one-time-pad encrypted communication, and errors in the sifted keys are corrected by the error correction sections 1105 and 1205 with the relatively high coding rate. That is, at the error correction section 1105 of Alice 11 and the error correction section 1205 of Bob 12, the respective sifted keys are divided into a plurality of blocks, and the parities of each block are checked with each other, thereby identifying a block containing an error. Error correction is performed by applying a code with the higher coding rate to that block. The sifted keys in which errors are thus corrected are subjected to the remaining error detection sections 1107 and 1207, where an error remaining after error correction is detected. If parities do not match (a remaining error is detected), error correction is performed again by the error correction sections 1105 and 1205, individually. The sifted keys in which errors are thus corrected are input to the privacy amplification sections 1109 and 1209, which then eliminate key information with a possibility of being leaked during photon transmission and store final keys in the final key accumulation sections 1111 and 1212, respectively. The thus obtained final keys are used as cryptographic keys by the encrypted communication sections 1114 and 1213.

The second paths are paths for creating cryptographic keys to be used for calculation of a hash value for message authentication, and errors in the sifted keys are corrected by the error correction sections 1106 and 1204 with the relatively low coding rate. That is, at the error correction section 1106 of Alice 11 and the error correction section 1204 of Bob 12, the respective sifted keys are divided into a plurality of blocks, and the parities of each block are checked with each other, thereby identifying a block containing an error. Error correction is performed by applying a code with the lower coding rate to that block. The sifted keys in which errors are thus corrected are subjected to the remaining error detection sections 1108 and 1206, where an error remaining after error correction is detected. If parities do not match (a remaining error is detected), error correction is performed again by the error correction sections 1106 and 1204, individually. The sifted keys in which errors are thus corrected are input to the privacy amplification sections 1110 and 1208, which then eliminate key information with a possibility of being leaked during photon transmission and store final keys in the final key accumulation sections 1112 and 1211, respectively. The hash calculation sections 1113 and 1210 calculate hash values by using the thus obtained final keys to perform message authentication.

For example, assuming that 3% is the error rate when photon transmission is performed between the photon transmission section 1101 and the photon reception section 1201, the error correction sections 1105 and 1205 use a LDPC (Low-Density Parity-check Code) code with a coding rate of 0.8, with which 3% errors narrowly can be corrected, while the error correction sections 1106 and 1204 use a LDPC code with a coding rate of 0.75 to sufficiently lower the error rate after error correction. In this case, the cryptographic key creation rate can be higher at the error correction sections 1105 and 1205, but cryptographic keys with a relatively high error rate are created due to erroneous correction and errors that cannot be corrected. On the other hand, since the error correction sections 1106 and 1204 perform error correction supposing sufficient allowance, the error rate after error correction is sufficiently low, but the cryptographic key creation rate is lower because the coding rate is kept low.

1.3) Effects

As described above, according to the present exemplary embodiment, error correction sections with a plurality of coding rates are provided by setting parameters in the error correction processing in accordance with error rates required of cryptographic keys. Therefore, it is possible to reduce the amount of key bits that are wastefully discarded, and it is possible to efficiently create cryptographic keys according to the purposes of use.

Note that as to the purposes of use of the final keys, for the purpose of one-time-pad encrypted communication, a relatively high error rate is allowed to increase the cryptographic key creation rate, while for the purpose of message authentication, a sufficiently low error rate is ensured at the sacrifice of the cryptographic key creation rate, but the present invention is not limited to these. When cryptographic keys are used for the purpose of periodically updating a cryptographic key for AES encrypted communication, parameters in the error correction processing may be changed in accordance with the frequency of updating the cryptographic key.

Moreover, a method for controlling the error rates of cryptographic keys is not limited to varying the coding rate in the error correction processing. The number of times parity check is performed in the remaining error detection processing may be varied, as will be described later. Further, for means for securely sharing a cryptographic key containing an error between Alice 11 and Bob 12, although a quantum cryptographic key distribution method is used, another means for sharing a secret key may be used.

2. Second Exemplary Embodiment

In a second exemplary embodiment of the present invention, the purposes of use of created cryptographic keys are assumed to be one-time-pad encrypted communication and message authentication. A description will be given of a method in which the error rates of final cryptographic keys are controlled by varying parameters in a single remaining error detection circuit.

2.1) Configuration

Figure 5:
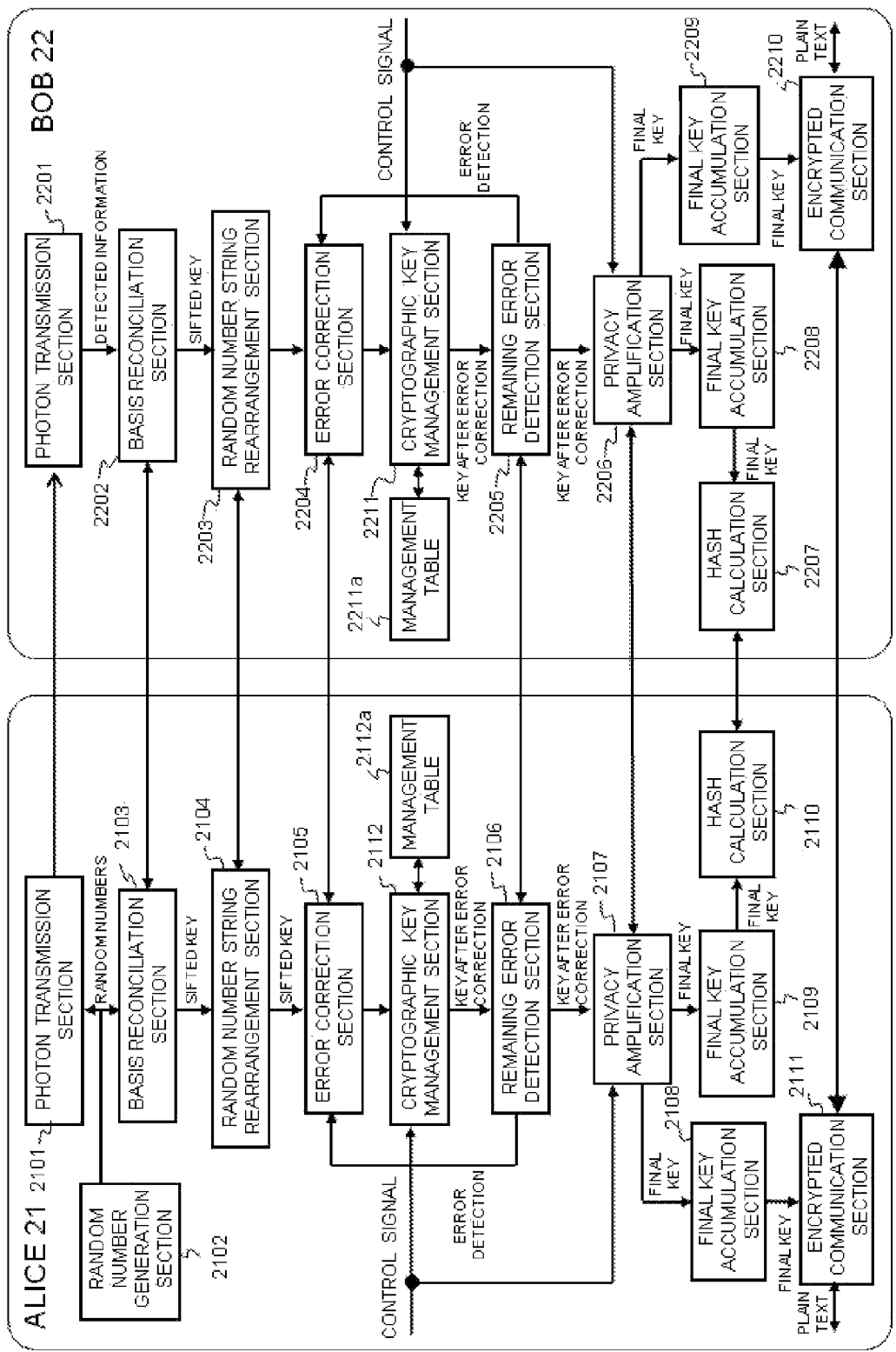
FIG. 5 is a block diagram showing functional configurations of communication devices in a cryptographic key sharing system according to a second exemplary embodiment of the present invention.

Referring to FIG. 5, a sending-side communication device 21 (hereinafter, referred to as Alice 21) and a receiving-side communication device 22 (hereinafter, referred to as Bob 22) are connected through a transmission link, through which photon transmission from Alice 21 to Bob 22 and communication during a cryptographic key creation process between Alice 21 and Bob 22 are performed, as will be described later.

Alice 21 includes a photon transmission section 2101 that transmits a photon signal to Bob 22, a random number generation section 2102, and a basis reconciliation section 2103 that performs basis reconciliation by performing communication with Bob 22, and a sifted key is obtained by the basis reconciliation section 2103 as described already. A random number string rearrangement section 2104 rearranges a random number string of the sifted key at random by performing communication with Bob 22, and an error correction section 2105 corrects errors existing in the sifted key after rearrangement.

A cryptographic key management section 2112 outputs the sifted key after error correction to a remaining error detection section 2106 at a subsequent stage and, in accordance with a control signal, sets the number of parity checks to be performed by the remaining error detection section 2106 by referring to a management table 2112a. The management table 2112a is stored in a memory (not shown). The remaining error detection section 2106 detects an error remaining in the key after error correction as many times as the set number of parity checks. A privacy amplification section 2107 eliminates key information with a possibility of being leaked to an eavesdropper and, in accordance with a control signal, stores a final cryptographic key with a smaller number of parity checks (with a relatively high error rate) and a final cryptographic key with a larger number of parity checks (with a relatively low error rate) in final key accumulation sections 2108 and 2109, respectively. A hash calculation section 2110, when every communication as described above is performed, uses the cryptographic key with the relatively low error rate accumulated in the final key accumulation section 2108 to calculate a hash value from the content of a communication, thus performing message authentication. An encrypted communication section 2111 uses the cryptographic key with the relatively high error rate accumulated in the final key accumulation section 2108 to perform encryption and decryption for encrypted communication.

Bob 22 includes a photon reception section 2201 that receives a photon signal transmitted from Alice 21, and a basis reconciliation section 2202 that performs basis reconciliation by performing communication with Bob 22, and a sifted key is obtained by the basis reconciliation section 2202 as described already. A random number string rearrangement section 2203 rearranges a random number string of the sifted key at random by performing communication with Alice 21, and an error correction section 2204 corrects errors existing in the sifted key after rearrangement.

A cryptographic key management section 2211 outputs the sifted key after error correction to a remaining error detection section 2205 at a subsequent stage and, in accordance with a control signal, sets the number of parity checks to be performed by the remaining error detection section 2205 by referring to a management table 2211a. The management table 2211a is stored in a memory (not shown). The remaining error detection section 2205 detects an error remaining in the key after error correction as many times as the set number of parity checks. A privacy amplification section 2206 eliminates key information with a possibility of being leaked to an eavesdropper and, in accordance with a control signal, stores a final cryptographic key with a smaller number of parity checks (with a relatively high error rate) and a final cryptographic key with a larger number of parity checks (with a relatively low error rate) in final key accumulation sections 2209 and 2208, respectively. A hash calculation section 2207, when every communication as described above is performed, uses the cryptographic key with the relatively low error rate accumulated in the final key accumulation section 2208 to calculate a hash value from the content of a communication, thus performing message authentication. An encrypted communication section 2210 uses the cryptographic key with the relatively high error rate accumulated in the final key accumulation section 2209 to perform encryption and decryption for encrypted communication.

In the management table 2112a of Alice 21 and the management table 2211a of Bob 22, the number of parity checks is set for each key ID for which a use is determined, as shown in FIG. 6. Here, parity check is repeated 32 times for a key for encrypted communication, while parity check is repeated 1024 times to make the error rate even lower for a key for authentication. Note that the number of parity checks may be determined depending on the purpose of use of a cryptographic key and is not limited to these numbers.

2.2) Operation

At Alice 21, the photon transmission section 2101 transmits a photon signal to Bob 22, based on random numbers output by the random number generation section 2102. At Bob 22, the photon reception section 2201 receives the photon signal transmitted from the photon transmission section 2101. Subsequently, the basis reconciliation sections 2103 and 2202 reconcile bases that they selected at the time of transmission and reception and extract only those key bits whose selected bases match with each other, thereby individually obtaining a sifted key. Next, the random number string rearrangement sections 2104 and 2203 rearrange the respective sifted keys, based on random numbers that have been shared separately.

The error correction sections 2105 and 2204 correct errors in the rearranged sifted keys. That is, the error correction section 2105 of Alice 21 and the error correction section 2204 of Bob 22 divide the respective sifted keys into a plurality of blocks and check the parities of each block with each other, thereby identifying a block containing an error and performing error correction on the block. The sifted keys in which errors are thus corrected are subjected to the remaining error detection sections 2106 and 2205, where an error remaining after error correction is detected as many times as the number of parity checks set by the cryptographic key management sections 2112 and 2211. If parities do not match (a remaining error is detected), error correction is performed again by the error correction sections 2105 and 2204, individually.

The sifted keys in which errors are thus corrected are input to the privacy amplification sections 2107 and 2206, which then eliminate key information with a possibility of being leaked during photon transmission and, in accordance with a control signal, store final keys obtained through a smaller number of parity checks in the final key accumulation sections 2108 and 2209, respectively, and store final keys obtained through a larger number of parity checks in the final key accumulation sections 2109 and 2208, respectively. The final keys with a relatively high error rate thus stored in the final key accumulation sections 2108 and 2209 are used for cryptographic keys by the encrypted communication sections 2111 and 2210, and the final keys with a relatively low error rate stored in the final key accumulation sections 2109 and 2208 are used by the hash calculation sections 2110 and 2207 to calculate hash values to perform message authentication.

In the present exemplary embodiment, cryptographic keys are managed with IDs. The cryptographic key management sections 2112 and 2211 change the number of parity checks in the remaining error detection processing based on the management tables 2112a and 2211a as shown in FIG. 6, whereby cryptographic keys with different error rates can be created by a single circuit. Cryptographic keys for which the error rate is set higher by making the number of parity checks smaller are stored in the final key accumulation sections 2108 and 2209 and are used for the purpose of one-time-pad encrypted communication by the encrypted communication sections 2111 and 2210. Cryptographic keys for which the error rate is set lower by making the number of parity checks larger are stored in the final key accumulation sections 2109 and 2208 for the purpose of message authentication and are used when the hash calculation sections 2110 and 2207 calculate hash values.

2.3) Effects

According to the present exemplary embodiment, effects similar to those of the first exemplary embodiment can also be obtained. Moreover, the present exemplary embodiment has the advantage that the number of implemented circuits can be reduced because cryptographic keys are managed with IDs and the error rates of final cryptographic keys are controlled by using a single circuit and varying the number of parity checks. Furthermore, there is also an advantage that cryptographic keys for a broader range of purposes can be easily created because the cryptographic key management sections 2112 and 2211 can create cryptographic keys with a plurality of error rates, based on the management tables 2112a and 2211a.

Note that it is also possible to combine the present exemplary embodiment and the first exemplary embodiment. That is, the error correction sections 2105 and 2204 and subsequent stages in FIG. 5 are divided into two paths as in the first exemplary embodiment, and the present exemplary embodiment is applied to the individual paths.

3. Third Exemplary Embodiment

According to a third exemplary embodiment of the present invention, the purposes of use of created cryptographic keys are a plurality of kinds of encrypted communication requiring different error rates of cryptographic keys. Note that a method for controlling the error rates is similar to that of the second exemplary embodiment.

3.1) Configuration

Figure 7:
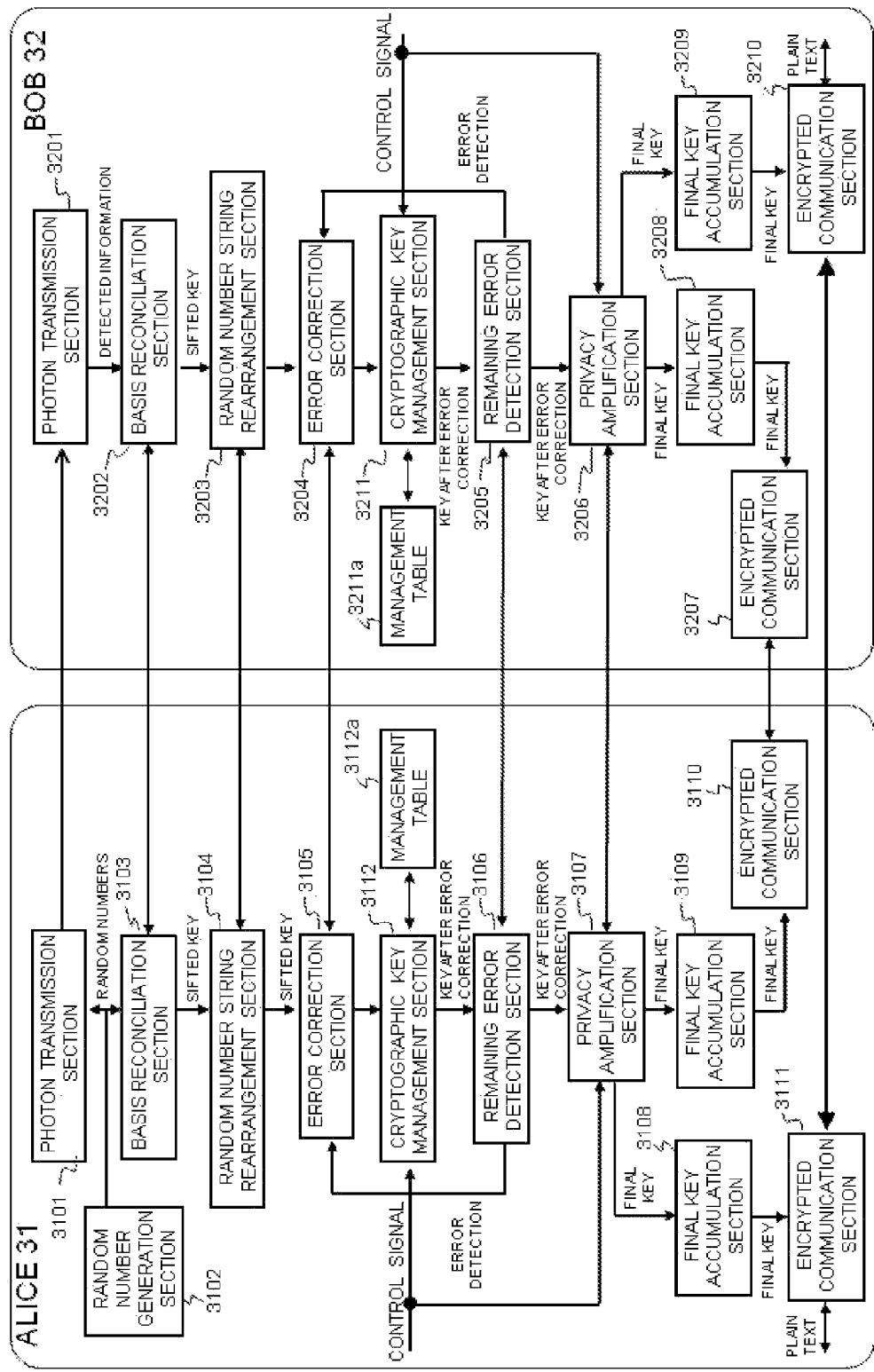
FIG. 7 is a block diagram showing functional configurations of communication devices in a cryptographic key sharing system according to a third exemplary embodiment of the present invention.

Referring to FIG. 7, a sending-side communication device 31 (hereinafter, referred to as Alice 31) and a receiving-side communication device 32 (hereinafter, referred to as Bob 32) are connected through a transmission link, through which photon transmission from Alice 31 to Bob 32 and communication during a cryptographic key creation process between Alice 31 and Bob 32 are performed, as will be described later.

Alice 31 includes a photon transmission section 3101 that transmits a photon signal to Bob 32, a random number generation section 3102, and a basis reconciliation section 3103 that performs basis reconciliation by performing communication with Bob 32, and a sifted key is obtained by the basis reconciliation section 3103 as described already. A random number string rearrangement section 3104 rearranges a random number string of the sifted key at random by performing communication with Bob 32, and an error correction section 3105 corrects errors existing in the sifted key after rearrangement.

A cryptographic key management section 3112 outputs the sifted key after error correction to a remaining error detection section 3106 at a subsequent stage and, in accordance with a control signal, sets the number of parity checks to be performed by the remaining error detection section 3106 by referring to a management table 3112a. The management table 3112a is stored in a memory (not shown). The remaining error detection section 3106 detects an error remaining in the key after error correction as many times as the set number of parity checks. A privacy amplification section 3107 eliminates key information with a possibility of being leaked to an eavesdropper and, in accordance with a control signal, stores a final cryptographic key with a smaller number of parity checks (with a relatively high error rate) and a final cryptographic key with a larger number of parity checks (with a relatively low error rate) in final key accumulation sections 3108 and 3109, respectively. The final key stored in the final key accumulation section 3108 is used for the purpose of one-time-pat encrypted communication by an encrypted communication section 3111, and the final key stored in the final key accumulation section 3109 is used to update a key for AES encrypted communication by an encrypted communication section 3111.

Bob 32 includes a photon reception section 3201 that receives a photon signal transmitted from Alice 31, and a basis reconciliation section 3202 that performs basis reconciliation by performing communication with Bob 32, and a sifted key is obtained by the basis reconciliation section 3202 as described already. A random number string rearrangement section 3203 rearranges a random number string of the sifted key at random by performing communication with Alice 31, and an error correction section 3204 corrects errors existing in the sifted key after rearrangement.

A cryptographic key management section 3211 outputs the sifted key after error correction to a remaining error detection section 3205 at a subsequent stage and, in accordance with a control signal, sets the number of parity checks to be performed by the remaining error detection section 3205 by referring to a management table 3211a. The management table 3211a is stored in a memory (not shown). The remaining error detection section 3205 detects an error remaining in the key after error correction as many times as the set number of parity checks. A privacy amplification section 3206 eliminates key information with a possibility of being leaked to an eavesdropper and, in accordance with a control signal, stores a final cryptographic key with a smaller number of parity checks (with a relatively high error rate) and a final cryptographic key with a larger number of parity checks (with a relatively low error rate) in final key accumulation sections 3209 and 3208, respectively. A hash calculation section 3207, when every communication as described above is performed, uses the cryptographic key with the relatively low error rate accumulated in the final key accumulation section 3208 to calculate a hash value from the content of a communication, thus performing message authentication. An encrypted communication section 3210 uses the cryptographic key with the relatively high error rate accumulated in the final key accumulation section 3209 to perform encryption and decryption for encrypted communication.

In the management table 3112a of Alice 31 and the management table 3211a of Bob 32, the number of parity checks is set for each key ID for which a use is determined as shown in FIG. 6, as in the second exemplary embodiment.

3.2) Operation

At Alice 31, the photon transmission section 3101 transmits a photon signal to Bob 32, based on random numbers output by the random number generation section 3102. At Bob 32, the photon reception section 3201 receives the photon signal transmitted from the photon transmission section 3101. Subsequently, the basis reconciliation sections 3103 and 3202 reconcile bases that they selected at the time of transmission and reception and extract only those key bits whose selected bases match with each other, thereby individually obtaining a sifted key. Next, the random number string rearrangement sections 3104 and 3203 rearrange the respective sifted keys, based on random numbers that have been shared separately.

The error correction sections 3105 and 3204 correct errors in the rearranged sifted keys. That is, the error correction section 3105 of Alice 31 and the error correction section 3204 of Bob 32 divide the respective sifted keys into a plurality of blocks and check the parities of each block with each other, thereby identifying a block containing an error and performing error correction on the block. The sifted keys in which errors are thus corrected are subjected to the remaining error detection sections 3106 and 3205, where an error remaining after error correction is detected as many times as the number of parity checks set by the cryptographic key management sections 3112 and 3211. If parities do not match (a remaining error is detected), error correction is performed again by the error correction sections 3105 and 3204, individually.

The sifted keys in which errors are thus corrected are input to the privacy amplification sections 3107 and 3206, which then eliminate key information with a possibility of being leaked during photon transmission and, in accordance with a control signal, store final keys obtained through a smaller number of parity checks in the final key accumulation sections 3108 and 3209, respectively, and store final keys obtained through a larger number of parity checks in the final key accumulation sections 3109 and 3207, respectively. The final keys with a relatively high error rate thus stored in the final key accumulation sections 3108 and 3209 are used for the purpose of one-time pad encrypted communication by the encrypted communication sections 3111 and 3210, and the final keys with a relatively low error rate stored in the final key accumulation sections 3109 and 3208 are used to update a key for AES encrypted communication by the encrypted communication sections 3110 and 3207.

3.3) Effects

According to the present exemplary embodiment, effects similar to those of the second exemplary embodiment can also be obtained. Note that although the present exemplary embodiment shows one-time-pad and AES as examples for encrypted communication methods, encrypted communication methods are not limited to these. They may be any purposes as long as they require different error rates of cryptographic keys.

4. Additional Statements

Part or all of the above-described exemplary embodiments also can be stated as in, but is not limited to, the following additional statements.

(Additional Statement 1)

A communication device that performs communication with another communication device through a transmission link, characterized by comprising:

cryptographic key sharing means for sharing a first cryptographic key with the other communication device;

error rate control means for creating second cryptographic keys with error rates according to purposes of use of the cryptographic keys from the first cryptographic key; and accumulation means for separately accumulating the plurality of second cryptographic keys with the different error rates.

(Additional Statement 2)

The communication device according to additional statement 1, characterized in that the error rate control means includes: error correction means for correcting an error included in the first cryptographic key; and remaining error detection means for detecting an error that cannot be corrected by the error correction, wherein the error rates are controlled by varying a coding rate of en error correction code used by the error correction means and/or a number of parity checks applied to the remaining error detection means.

(Additional Statement 3)

The communication device according to additional statement 2, characterized in that the error rate control means has a management table in which a plurality of numbers of parity checks are predetermined in accordance with the purposes of use of the cryptographic keys.

(Additional Statement 4)

The communication device according to additional statement 2 or 3, characterized in that the error rate control means is provided with a plurality of error correction means with different coding rates and controls the error rates by selecting any one of the plurality of error correction means in accordance with the purposes of use of the cryptographic keys.

(Additional Statement 5)

A cryptographic key creation method in a communication device that performs communication with another communication device through a transmission link, characterized by comprising:

by cryptographic key sharing means, sharing a first cryptographic key with the other communication device;

by error rate control means, creating second cryptographic keys with error rates according to purposes of use of the cryptographic keys from the first cryptographic key; and by accumulation means, separately accumulating the plurality of second cryptographic keys with the different error rates.

(Additional Statement 6)

The cryptographic key creation method according to additional statement 5, characterized in that the error rate control means corrects an error included in the first cryptographic key, detects a remaining error that cannot be corrected by the error correction, and controls the error rates by varying a coding rate of en error correction code used for the error correction and/or a number of parity checks applied to the remaining error detection.

(Additional Statement 7)

The cryptographic key creation method according to additional statement 6, characterized in that the error rate control means has a management table in which a plurality of numbers of parity checks are predetermined in accordance with the purposes of use of the cryptographic keys.

(Additional Statement 8)

The cryptographic key creation method according to additional statement 6 or 7, characterized in that the error rate control means is provided with a plurality of error correction means with different coding rates and controls the error rates by selecting any one of the plurality of error correction means in accordance with the purposes of use of the cryptographic keys.

(Additional Statement 9)

A cryptographic key sharing system in which first and second communication devices share a cryptographic key by performing communication through a transmission link, characterized in that the first and second communication devices share a first cryptographic key, and each of the first and second communication devices creates second cryptographic keys with error rates according to purposes of use of the cryptographic keys from the first cryptographic key and separately accumulates the plurality of second cryptographic keys with the different error rates.

(Additional Statement 10)

The cryptographic key sharing system according to additional statement 10, characterized in that each of the first and second communication devices corrects an error included in the first cryptographic key, detects a remaining error that cannot be corrected by the error correction, and controls the error rates by varying a coding rate of en error correction code used for the error correction and/or a number of parity checks applied to the remaining error detection.

(Additional Statement 11)

The cryptographic key sharing system according to additional statement 10, characterized in that each of the first and second communication devices has a management table in which a plurality of numbers of parity checks are predetermined in accordance with the purposes of use of the cryptographic keys.

(Additional Statement 12)

The cryptographic key sharing system according to additional statement 10 or 11, characterized in that each of the first and second communication devices is provided with a plurality of error correction means with different coding rates and controls the error rates by selecting any one of the plurality of error correction means in accordance with the purposes of use of the cryptographic keys.

(Additional Statement 13)

A program causing a program-controlled processor to implement a function at a communication device that performs communication with another communication device through a transmission link, characterized by causing the program-controlled processor to implement the functions of:

cryptographic key sharing means sharing a first cryptographic key with the other communication device;

error rate control means creating second cryptographic keys with error rates according to purposes of use of the cryptographic keys from the first cryptographic key; and accumulation means separately accumulating the plurality of second cryptographic keys with the different error rates.

(Additional Statement 14)

The program according to additional statement 13, characterized in that the error rate control means corrects an error included in the first cryptographic key, detects a remaining error that cannot be corrected by the error correction, and controls the error rates by varying a coding rate of en error correction code used for the error correction and/or a number of parity checks applied to the remaining error detection.

(Additional Statement 15)

The program according to additional statement 14, characterized in that the error rate control means has a management table in which a plurality of numbers of parity checks are predetermined in accordance with the purposes of use of the cryptographic keys.

(Additional Statement 16)

The program according to additional statement 14 or 15, characterized in that the error rate control means is provided with a plurality of error correction means with different coding rates and controls the error rates by selecting any one of the plurality of error correction means in accordance with the purposes of use of the cryptographic keys.

INDUSTRIAL APPLICABILITY

The present invention is applicable to a highly secret communication using shared cryptographic key distribution technology typified by quantum cryptographic key distribution technology. A method for quantum key distribution is irrespective of whether it is unidirectional or is bidirectional.

REFERENCE SIGNS LIST 11, 21, 31 Alice (sending-side communication device)
1101, 2101, 3101 Photon transmitter
1102, 2102, 3102 Random number generation section
1103, 2103, 3103 Basis reconciliation section
1104, 2104, 3104 Random number string rearrangement section
1105, 1106, 2105, 3105 Error correction section
1115, 2112, 3112 Cryptographic key management section
1107, 1108, 2106, 3106 Remaining error detection section
1109, 1110, 2107, 3107 Privacy amplification section
1111, 1112, 2108, 2109, 3108, 3109 Final key accumulation section
1113, 2110 Hash calculation section
1114, 2111, 3110, 3111 Encrypted communication section
12, 22, 32 Bob (receiving-side communication device)
1202, 2202, 3202 Basis reconciliation section
1203, 2203, 3203 Random number string rearrangement section
1204, 1205, 22045, 3204 Error correction section
1214, 2211, 3211 Cryptographic key management section
1206, 1207, 2205, 3205 Remaining error detection section
1208, 1209, 2206, 3206 Privacy amplification section
1211, 1212, 2208, 2209, 3208, 3209 Final key accumulation section
1210, 2207 Hash calculation section
1213, 2210, 3207, 3210 Encrypted communication section

What is claimed is:

1. A communication device that performs communication with another communication device through a transmission link, comprising:

a cryptographic key sharing section for sharing a first cryptographic key with the other communication device;

an error rate controller for creating a plurality of second cryptographic keys with different error rates each according to purposes of use of the cryptographic keys from the first cryptographic key; and an accumulation section for separately accumulating the plurality of second cryptographic keys with the different error rates for respective purposes of use of the cryptographic keys, wherein one of the plurality of second cryptographic keys with a first error rate is used for encrypted communication and another one of the plurality of second cryptographic keys with a second error rate is used for message authentication.

2. The communication device according to claim 1, wherein the error rate controller includes: an error correction section for correcting an error included in the first cryptographic key; and a remaining error detection section for detecting an error unable to be corrected by the error correction, wherein the error rates are controlled by varying at least one of a coding rate of an error correction code used by the error correction section and a number of parity checks applied to the remaining error detection section.

3. The communication device according to claim 2, wherein the error rate controller has a management table in which a plurality of numbers of parity checks are predetermined in accordance with the purposes of use of the cryptographic keys.

4. The communication device according to claim 3, wherein the error rate controller is provided with a plurality of error correctors with different coding rates and controls the error rates by selecting any one of the plurality of error correctors in accordance with the purposes of use of the cryptographic keys.

5. The communication device according to claim 2, wherein the error rate controller is provided with a plurality of error correctors with different coding rates and controls the error rates by selecting any one of the plurality of error correctors in accordance with the purposes of use of the cryptographic keys.

6. A cryptographic key creation method in a communication device that performs communication with another communication device through a transmission link, comprising:

sharing a first cryptographic key with the other communication device by a cryptographic key sharing section;

creating a plurality of second cryptographic keys with different error rates each according to purposes of use of the cryptographic keys from the first cryptographic key by an error rate controller; and separately accumulating the plurality of second cryptographic keys with the different error rates for respective purposes of use of the cryptographic keys by an accumulation section, wherein one of the plurality of second cryptographic keys with a first error rate is used for encrypted communication and another one of the plurality of second cryptographic keys with a second error rate is used for message authentication.

7. The cryptographic key creation method according to claim 6, wherein the error rate controller corrects an error included in the first cryptographic key, detects a remaining error unable to be corrected by the error correction, and controls the error rates by varying at least one of a coding rate of an error correction code used for the error correction and a number of parity checks applied to the remaining error detection.

8. The cryptographic key creation method according to claim 7, wherein the error rate controller has a management table in which a plurality of numbers of parity checks are predetermined in accordance with the purposes of use of the cryptographic keys.

9. The cryptographic key creation method according to claim 8, wherein the error rate controller is provided with a plurality of error correction section with different coding rates and controls the error rates by selecting any one of the plurality of error correction section in accordance with the purposes of use of the cryptographic keys.

10. The cryptographic key creation method according to claim 7, wherein the error rate controller is provided with a plurality of error correction section with different coding rates and controls the error rates by selecting any one of the plurality of error correction section in accordance with the purposes of use of the cryptographic keys.

11. A cryptographic key sharing system in which first and second communication devices share a cryptographic key by performing communication through a transmission link, wherein the first and second communication devices share a first cryptographic key, and each of the first and second communication devices creates a plurality of second cryptographic keys with different error rates each according to purposes of use of the cryptographic keys from the first cryptographic key and separately accumulates the plurality of second cryptographic keys with the different error rates for respective purposes of use of the cryptographic keys, wherein one of the plurality of second cryptographic keys with a first error rate is used for encrypted communication and another one of the plurality of second cryptographic keys with a second error rate is used for message authentication.

12. The cryptographic key sharing system according to claim 11, wherein each of the first and second communication devices corrects an error included in the first cryptographic key, detects a remaining error unable to be corrected by the error correction, and controls the error rates by varying at least one of a coding rate of an error correction code used for the error correction and a number of parity checks applied to the remaining error detection.

13. The cryptographic key sharing system according to claim 12, wherein each of the first and second communication devices has a management table in which a plurality of numbers of parity checks are predetermined in accordance with the purposes of use of the cryptographic keys.

14. The cryptographic key sharing system according to claim 13, wherein each of the first and second communication devices is provided with a plurality of error correctors with different coding rates and controls the error rates by selecting any one of the plurality of error correctors in accordance with the purposes of use of the cryptographic keys.

15. The cryptographic key sharing system according to claim 12, wherein each of the first and second communication devices is provided with a plurality of error correctors with different coding rates and controls the error rates by selecting any one of the plurality of error correctors in accordance with the purposes of use of the cryptographic keys.

* * * * *